United States Patent
Fuchs

(10) Patent No.: US 10,204,120 B2
(45) Date of Patent: Feb. 12, 2019

(54) ERROR CHECKING DATABASE RECORDS

(71) Applicant: salesforce.com, inc., San Francisco, CA (US)

(72) Inventor: Matthew Fuchs, Los Gatos, CA (US)

(73) Assignee: salesforce.com, inc., San Francisco, CA (US)

( * ) Notice: Subject to any disclaimer, the term of this patent is extended or adjusted under 35 U.S.C. 154(b) by 764 days.

(21) Appl. No.: 14/490,841

(22) Filed: Sep. 19, 2014

(65) Prior Publication Data
US 2016/0085789 A1    Mar. 24, 2016

(51) Int. Cl.
G06F 17/30    (2006.01)

(52) U.S. Cl.
CPC .. *G06F 17/30303* (2013.01); *G06F 17/30371* (2013.01)

(58) Field of Classification Search
CPC ............... G06F 17/30303; G06F 17/30371
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |

(Continued)

OTHER PUBLICATIONS

Kanber, Machine Learning: Naive Bayes Document Classification Algorithm in Javascript, May 2, 2013, pp. 1-8.*

*Primary Examiner* — Albert M Phillips, III
(74) *Attorney, Agent, or Firm* — Dergosits & Noah LLP; Todd A. Noah

(57) ABSTRACT

An error checking technique for database records. A record is selected and its entities are compared with the entities of other records stored in the database to determine a likelihood that the labels associated with the entities of the selected record are correct. The likelihood for each entity of the selected record being correctly labeled can be determined by comparing the number of times that the entity appears in the database records with that label to the number of times that the entity appears in the database records with any other label. If the likelihood does not exceed a threshold, then an error is likely, and action can be taken to correct the record.

14 Claims, 7 Drawing Sheets

(56) References Cited

U.S. PATENT DOCUMENTS

| | | |
|---|---|---|
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,449,333 B2 | 9/2016 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0026163 A1* | 2/2006 | Forman ............. G06F 17/30737 |
| 2009/0063415 A1 | 3/2009 | Chatfield et al. |
| 2009/0100342 A1 | 4/2009 | Rueben et al. |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2015/0261772 A1* | 9/2015 | Lorenz ............. G06F 17/30303 |
| | | 707/723 |

* cited by examiner

400

| | [fname] | [lname] | [title] | [cname] | • • • |
|---|---|---|---|---|---|
| R1 | [John] | [Doe] | [Vice-President, Sales] | [Oracle] | • • • |
| R2 | [George] | [Smith] | [Vice-President, Engineering] | [Intel] | • • • |
| R3 | [Jack] | [Daniel] | [Vice-President, Legal] | [ABC] | • • • |
| | • | • | • | • | |
| | • | • | • | • | |
| | • | • | • | • | |

*FIG. 4*

ERROR CHECKING DATABASE RECORDS

TECHNICAL FIELD

This disclosure relates generally to database management, and more particularly, to systems and methods implementing an error checking technique for database records.

COPYRIGHT NOTICE

Portions of this disclosure contain material which is subject to copyright protection. The copyright owner has no objection to the facsimile reproduction by anyone of the patent document or the patent disclosure, as it appears in the records of the United States Patent and Trademark Office, but otherwise reserves all rights.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents one or more different approaches to database management issues, which may be unique.

In a multi-tenant database system ("MTS"), various hardware and software components comprise the database and may be shared by one or more customers as a "cloud computing" solution for data storage and management. Service providers offer access to such systems through a network, such as the Internet. For example, an application server may be configured to simultaneously process multiple requests for many different customers, and a database may be configured to store data that is shared by many different customers.

Customers of database systems demand that the data they purchase be comprehensive and accurate. An ongoing business enterprise typically maintains significant amounts of data in a database related to the company's business, including information pertinent to sales, revenue, costs, business opportunities, inventory, networking, etc. As one example, electronic business cards or contacts are the lifeblood of many organizations, and the contact information can be maintained in the database. However, maintaining the accuracy of the contacts or any other information stored in a database can be tedious, particularly when significant amounts of the information are provided by users, i.e., crowd sourcing. For example, data entry errors, such as reversing the first name and last name for a contact, are common for such crowd sourced database systems.

Thus, it would thus be desirable to provide an error checking routine that could be used to identify one or more errors in a database record, and which could initiate action to correct the errors.

BRIEF DESCRIPTION OF THE DRAWINGS

In the following drawings, like reference numbers are used to refer to like elements. Although the following figures depict various examples, the one or more implementations are not limited to the examples depicted in the figures.

FIG. 4 is an example of a data table storing the records shown in FIG. 3.

DETAILED DESCRIPTION

1. Overview

This disclosure describes systems and methods for error checking database records. A record having defined entities with assigned labels is selected for analysis. The entities of the selected record are compared with the entities of other records stored in the database to determine a likelihood that the labels assigned to the entities of the selected record are correct. The likelihood for each entity can be determined by comparing the number of times that the entity appears in the database records with that label to the number of times that the entity appears in the database records with any other label. If the likelihood does not exceed a threshold, then an error is likely, and action can be taken to correct the record.

2. Hardware/Software Environment

In general, the methods described herein may be implemented as software routines forming part of a database system for the storage and management of data records. As used herein, the term multi-tenant database system ("MTS") refers to those systems in which various elements of hardware and software of the database system may be shared by one or more customers. For example, an application server may simultaneously process requests for a large number of customers, and a database table may store rows of data for a potentially much larger number of customers. As used herein, the term query refers to a set of steps used to access information in a database system.

Figure 1:
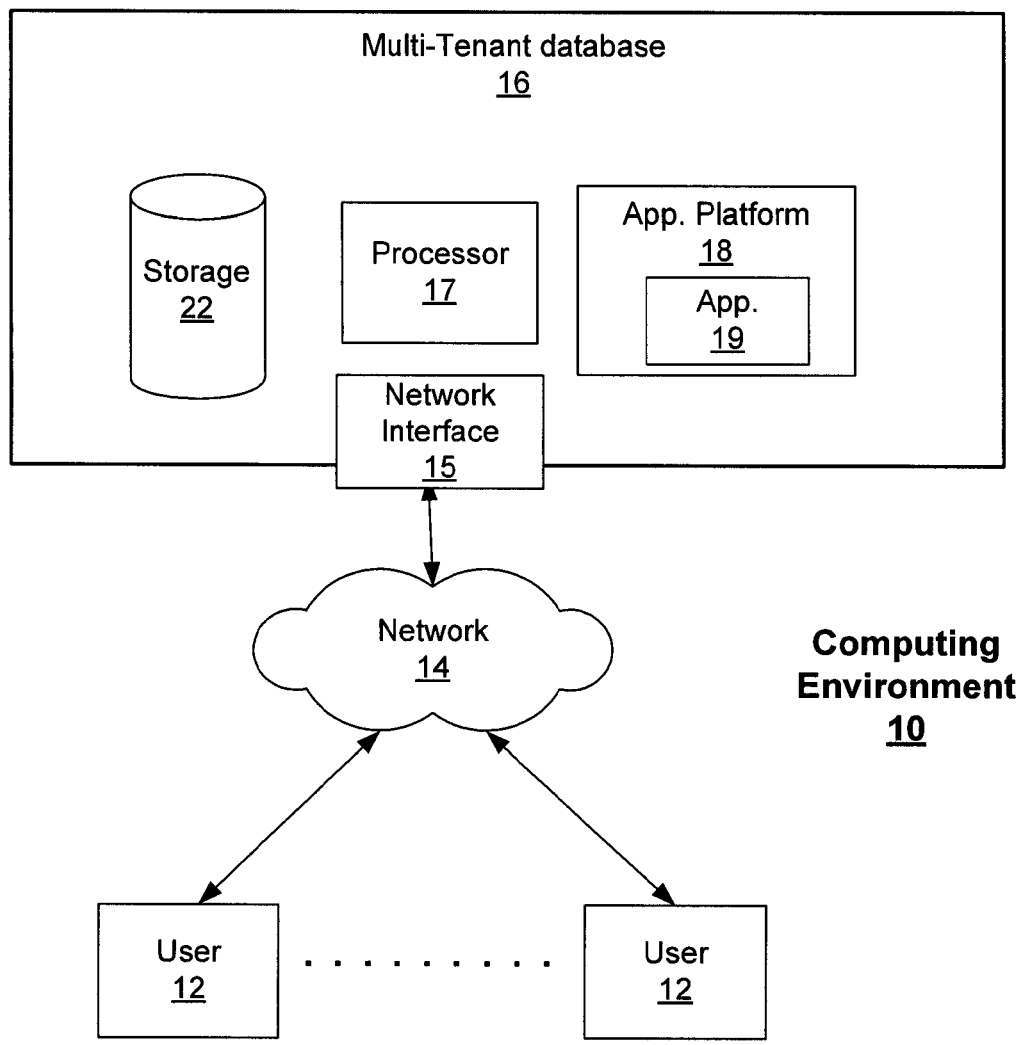
FIG. 1 is a simplified block diagram illustrating an embodiment using an on-demand database system.
Figure 2A:
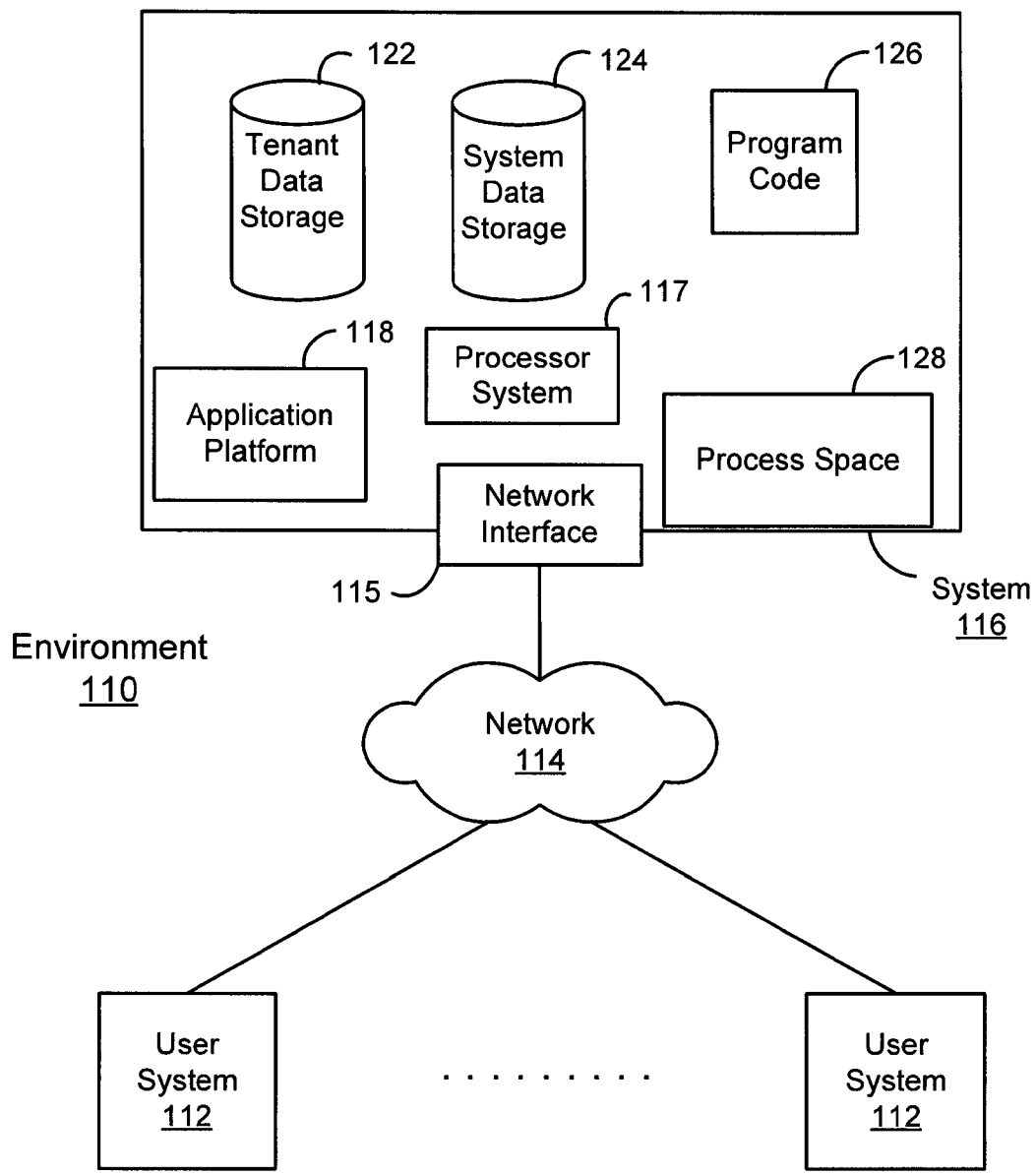
FIG. 2A illustrates a block diagram of an example environment for an on-demand multi-tenant database ("MTS") service.
Figure 2B:
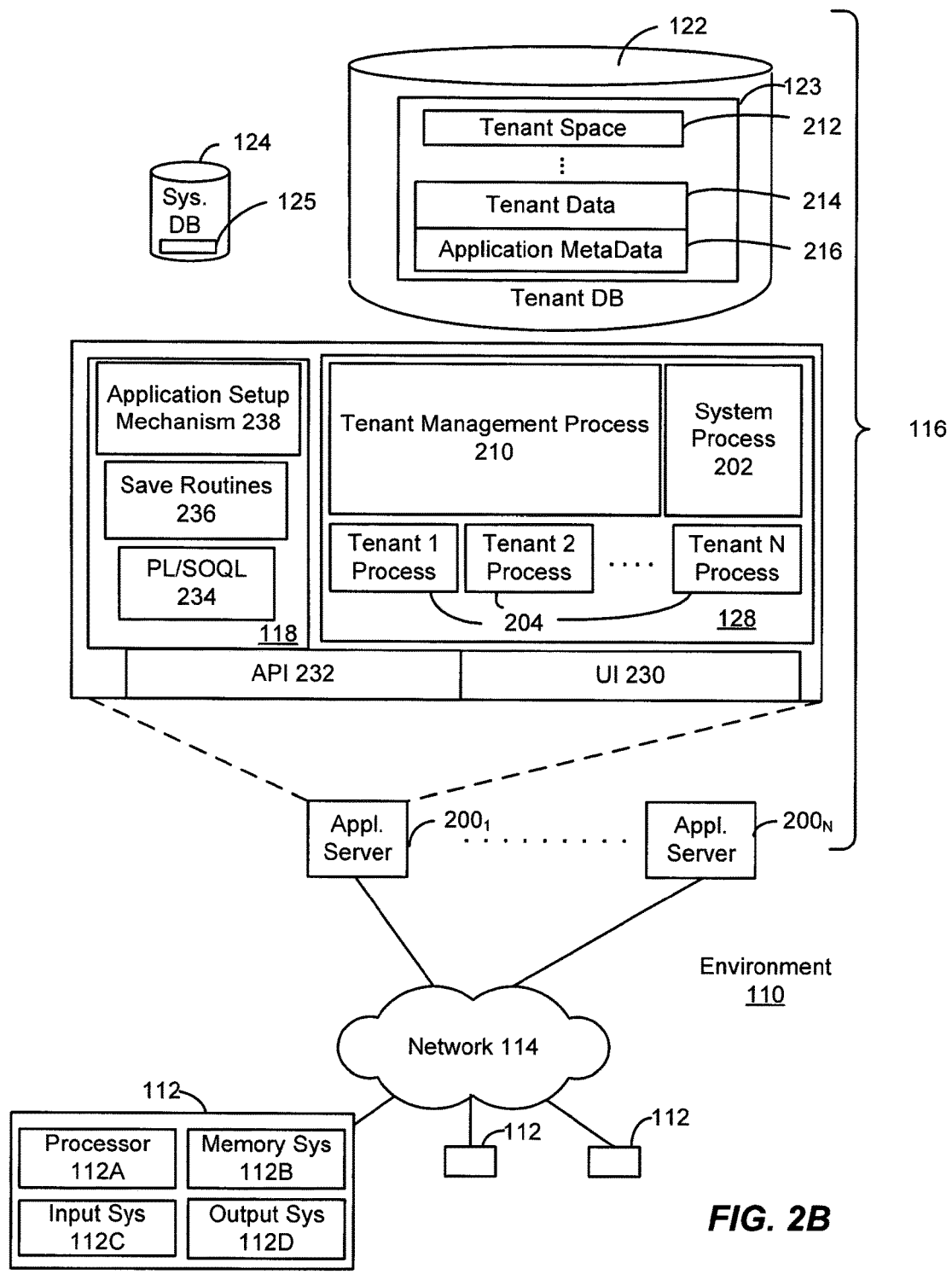
FIG. 2B illustrates a block diagram of an embodiment of elements of FIG. 2A and various possible interconnections between those elements.

FIG. 1 is a simplified block diagram illustrating an embodiment of an on-demand multi-tenant database system 16 operating in a computing environment 10. User devices or systems 12 access and communicate with the database system 16 through network 14 in a known manner. More detailed embodiments of an on-demand multi-tenant database system 116 are shown in FIGS. 2A and 2B, described at the end of this Detailed Description.

User devices 12 may be any type of fixed or mobile processor-based computing device, such as a desktop computer, laptop computer, tablet, smartphone, etc. Network 14 may be any type of processor-based computing network, such as the Internet, local area network ("LAN"), wide area network ("WAN"), etc.

The operation of the database system 16 is controlled by a central processor system 17, and a network interface 15 manages inbound and outbound communications between the database system 16 and the network 14. One or more applications 19 are managed and operated by the database system 16 through application platform 18. For example, a database management application runs on application platform 18 and provides program instructions executed by the processor 17 for indexing, accessing, updating and storing information. In addition, a number of methods are described herein which may be incorporated, preferably as software routines, into the database management application for error checking the records stored in the database and/or new records presented to the database for storage.

The database system 16 provides user systems 12 with managed access to many database features and applications. For example, the database system 16 provides access to tenant data storage 22, which is configured through the database system to maintain data for multiple users/tenants. Tenant data storage 22 may be physically incorporated within the database system 16, or configured as remote storage (not shown), likewise accessible and useful to the database system to support user systems 12. The database system 16 is designed to facilitate storage and organized access for many different types of tenant data.

3. Database Records

A database is a collection of objects, such as a set of logical tables, containing data that is organized into defined categories. The objects are typically accessible through an application programming interface (API), which is provided by a software application, for example, a customer relationship management (CRM) software product, such as those offered by salesforce.com, of San Francisco, Calif. A table is one representation of a data object, and is used herein to simplify the conceptual description of objects, but should not be considered limiting. The terms "table" and "object" may be used interchangeably herein. Each table generally contains one or more data categories logically arranged as columns or fields or properties according to a defined schema. Each row of the table is a record containing an instance of data for each category defined by the fields.

Figure 3:
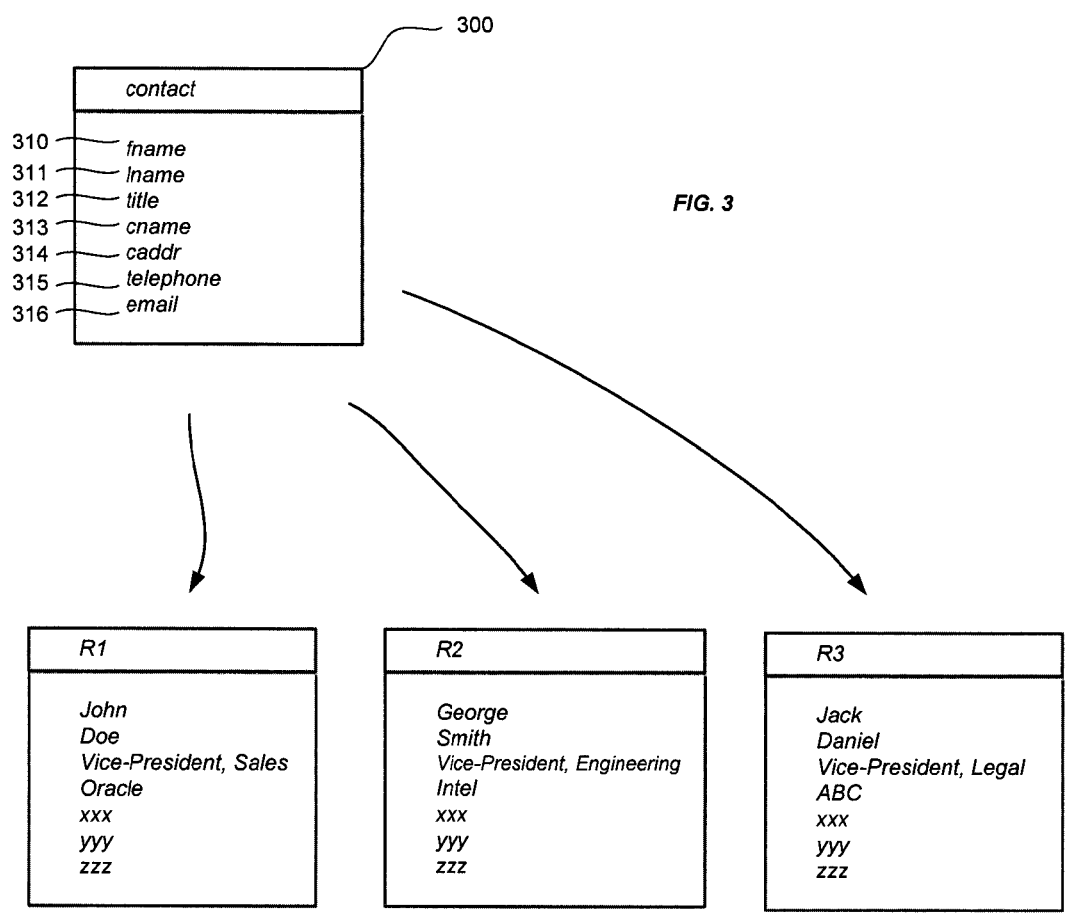
FIG. 3 is a block diagram illustrating a schema for a business contact and several records created according to the schema.

In a typical example, a database such as database system 16 stores and provides access to large numbers of records containing the information of one or more organizations. Each type of record may be defined to include multiple fields or properties. For example, FIG. 3 shows a representation for a typical schema 300 for a particular type of database record called a "contact." The contact 300 can be defined as a standard database object to include a number of predefined fields or properties related to a personal or business contact, including a field "fname" 310 for a first name; a field "lname" 311 for a last name; a field "title" 312 for a job title; a field "cname" 313 for a company name; a field "caddr" 314 for a company address; a field "telephone" 315 for a telephone number; a field "email" 316 for an email address, and so forth. The fields shown and described are merely illustrative since a database record and its schema could be constructed in many ways for many different applications with different numbers of fields or properties. Individual data records R1, R2 and R3, for example, are created according to the schema 300 and each record represents a business card or contact for a single individual having values for the predefined fields, some of which are shown in FIG. 3.

FIG. 4 illustrates one embodiment of a table 400, where records R1, R2, R3 are stored as separate rows in the table organized in accord with schema 300, each row being a collection of values for a single record, and each column being a field or data category applicable to all rows in the table. For example, row R1 includes the data values "John", "Doe", "Vice-President, Sales", and "Oracle"; row R2 includes the data values "George", "Smith", "Vice-President, Engineering", and "Intel"; and row R3 includes the data values "Jack", "Daniel", "Vice-President, Legal", and "ABC".

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled Custom Entities and Fields in a Multi-Tenant Database System, is hereby incorporated herein by reference, and teaches systems and methods for creating custom objects as well as customizing standard objects in a multi-tenant database system. In certain embodiments, all custom entity data rows are stored in a single multi-tenant physical table, which may contain multiple logical tables per organization. It is transparent to customers that their multiple "tables" are in fact stored in one large table or that their data may be stored in the same table as the data of other customers.

Database access is typically secure such that users may only access objects for which they have authorization, as determined by the organization configuration, user permissions and access settings, data sharing model, and/or other factors related specifically to the system and its objects. For example, users of the database can subscribe to one or more objects on the database in order to access, create and update records related to the objects.

4. Error Checking Database Records

An important objective for a database administrator is to maintain accurate information in the database. For example, in a database that incorporates crowd-sourced data, there is a significant likelihood of at least some data errors. A unique feature of the system and methods described herein is one or more applications, managed and operated by the database through its application platform, that facilitate this objective by providing software routines including one or more sets of program instructions that generate tools and features and perform actions and operations to help maintain and secure the accuracy and reliability of the stored data. For example, in one embodiment described herein, instructions are provided in a routine for checking the quality of new or stored records. If a record is found to have errors, then the record may be flagged for action. For example, the record could be automatically updated; or updated subject to administrator approval; or updated upon approval by a third party, e.g., the owner of the record.

Figure 5:
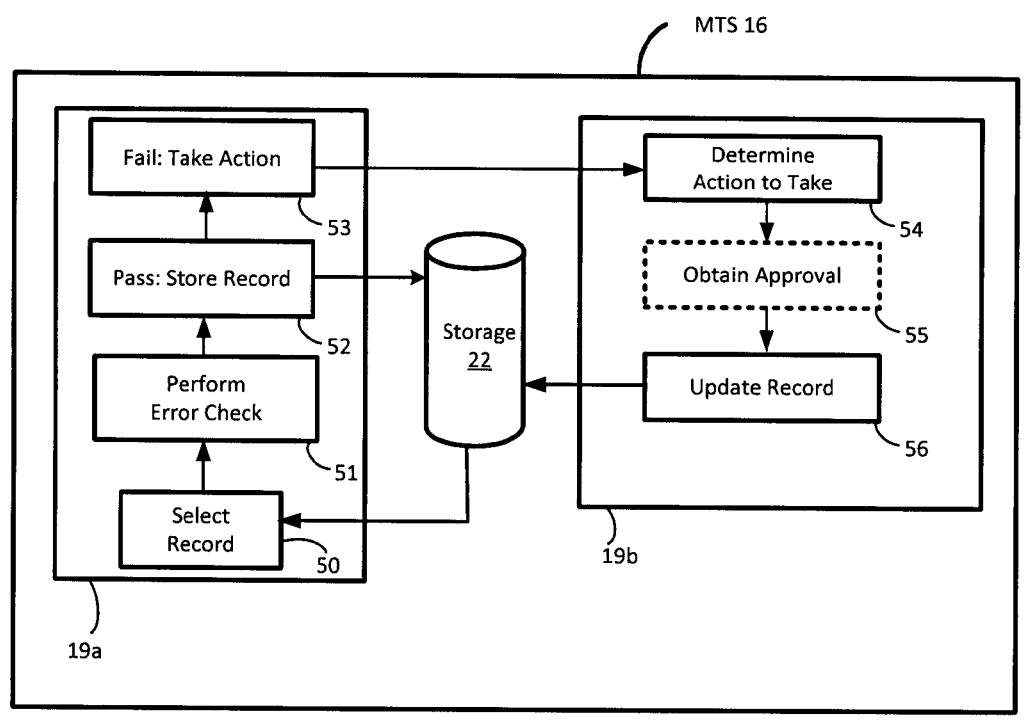
FIG. 5 is a block diagram illustrating the operational flow caused by program instructions for error checking a database record.

The block diagram shown in FIG. 5 illustrates one embodiment of an application 19a that performs initial data handling and error checking of records. A corresponding application 19b handles the action steps that can be performed after an error is determined. Although the two applications 19a and 19b are shown as part of the database 16, these applications may implemented as integrated or discrete parts or modules, and may also be located elsewhere, but accessible to the database. Also, the construction of suitable program code and interaction between different code modules can vary greatly according to need and/or desire and software platform, and thus the illustrated embodiments are not intended to limit how various software solutions may be implemented.

In error checking application 19a, a first program module 50 has program code suitable to select a record from storage 22, or a newly created record (not shown). A second program module 51 performs the error check routine. A third program module 52 returns the record to storage 22 if it passes the error check routine. A fourth program module 53 sends the record to application 19b to further processing if the record does not pass the error check routine.

In error handling application 19b, a first program module 54 determines what action to take. For example, as noted above, the record could be automatically updated; or updated subject to administrator approval; or updated upon approval by a third party, e.g., the owner of the record. A second optional program module 55 obtains approval if necessary, for example, from a third party such as a supervisory administrator, or the owner of the record. A third program module 56 updates the record after the appropriate action is taken to correct the record.

The error checking application is designed to look for erroneous data in a selected record by comparing the given data in the selected record to the database as a whole. It is generally reasonable to assume that most of the data in a database is accurate, i.e., no errors, even when the data is crowd-sourced. Thus, if some data is unusual when compared to all other data, it is likely to have errors. This principle can be implemented by using probabilistic techniques to evaluate the data, as will be described.

Consider a database as an example of labeled data. Using a table as a representative data structure, the data are represented as values stored in rows, also called entities, and each column of data values or entities has a name or label associated with it. The relationship between the entities and the labels is bidirectional. For every label, there is a set of entities which have that label, and for every entity, there may be multiple labels associated with the entity.

Figure 6:
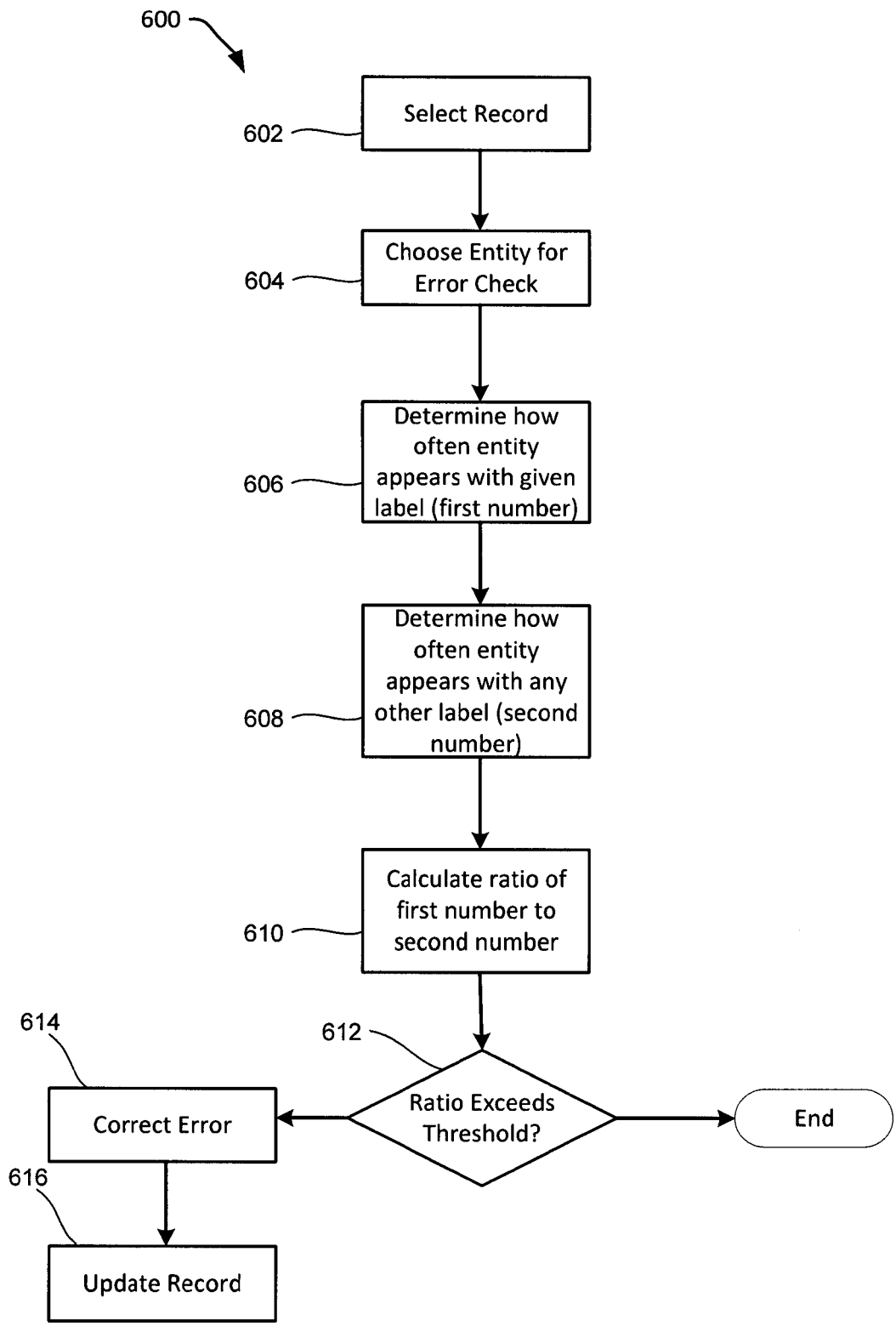
FIG. 6 is a flow chart illustrating one embodiment of a process for error checking a database record.

This data structure lends itself to a simple process 600, illustrated in FIG. 6, for performing an error check routine on the labels for any record and/or for a single entity of the record. In step 602, a record is selected for the error checking analysis. Typically, the record is copied into temporary storage for the duration of the routine. Further, the record includes a plurality of predefined entities, each entity having a predefined label, in accord with the type of schema of the record.

In step 604, a first entity of the selected record is chosen for error checking. In step 606, the number of times that the first entity appears with the first label in the records of the database is determined as a first number. In step 608, the number of times that the first entity appears with any label other than the first label in the records of the database is determined as a second number. In step 610, the ratio of the first number to the second number is determined. If the ratio exceeds a threshold in step 612, then there is unlikely to be an error associated with the labeling of the first entity of the selected record, and the routine ends. If the ratio does not exceed the threshold in step 612, then there is likely to be an error associated with the labeling of the first entity of the selected record, and in step 614, the error is corrected. In step 616, the record is updated in the database.

Of course, some entities may include multiple terms or compound values, such as title or address. It is possible for such entities to consider each term separately and/or to consider the group of terms as a whole.

As noted above, some entities may have multiple associated labels. For example, a term like "Michigan" will most often show up as a state, but could also show up in a company name or a street name. It is highly unlikely that "Michigan" will show up as a first name. As noted above, the likelihood P(L|E) of a label given an entity (or a word in an entity) can be quantified as the total number of times the entity appears in the database with that specific label divided by the total number of times the entity appears anywhere in the database, with any label. Thus, the quality of a specific label for any record can be evaluated by determining the likelihood that the label is correct. Further, that determination can be compared to a determination with regard to alternative labels.

For example, consider a record with values fname="John", lname="Doe," title="President", and cname="Michigan Foobar Co." The likelihood P(L|E) of these labels being correct is given by multiplying the probability of each individual term being correct as follows:

$$P(L|E)=P(fname|John)*P(lname|Doe)*P(title|President)*P(cname|Michigan\ Foobar\ Corp.)$$

Calulating the probability P(L|E) may involve multiplying several conditional probabilities. In this example, each of the conditional probabilities is probably close to 1.0, and thus, even after multiplying the individual probabilities together, the result is still close to 1.0, indicating that the result shown above is likely.

Consider a different record with values fname="Doe", lname="President," title="John", and cname="Michigan Foobar Co." The likelihood P(L|E) that these labels are correct is given by:

$$P(L'|E)=P(fname|Doe)*P(lname|President)*P(title|John)*P(cname|Michigan\ Foobar\ Corp.)$$

The result of this calculation is extremely small since the first three terms are very unlikely to appear with the associated labels.

In addition to identifying mislabeled values, this technique can also be used to identify permuted values. For example, if a set of values in a record results in a low probability for an assigned label, the assigned labels can be permuted to identify a more probable labeling, and the more probable labeling can then be presented to a user for verification. In the last example, the erroneous record "Doe, President, John, Michigan Foobar Corp" could be fixed by examining the five possible reordering of these terms.

Returning to the subject of fields with compound values, such as company name, title, and address, the likelihood of the composite and the likelihood of the constituent words can both be considered. For example, "Michigan Corp" might be reasonable as a company name, but "Michigan Lane" would not be reasonable because "Lane" is fairly improbable in a company name. Alternatively, if the value is rare, but the joint distribution is reasonable, then there is a likelihood that the constituent words are permutated; e.g., "Director, Managing" may be a permutation of "Managing Director".

The error check routine described herein can be performed initially over the entire database to establish an initial set of probabilities for each labeled entity in all of the records and then over it again to actually score records. Since such calculations are processing intensive, the use of distributed computing, including memcached storage, is desirable for performing the error check routine in order to provide more efficient processing. This initial set of probabilities can then be stored in a data structure and referenced by the error checking routine. As a new record is entered into the database, it can be error checked against the initial probabilities stored in the data structure.

The error check routine may thereafter be performed periodically to update the stored probabilities related to the entire set of records stored in the database.

5. Detailed Database Embodiments

FIG. 2A is a block diagram of an exemplary environment 110 for use of an on-demand database service. Environment 110 may include user systems 112, network 114 and system 116. Further, the system 116 can include processor system 117, application platform 118, network interface 120, tenant data storage 122, system data storage 124, program code 126 and process space 128. In other embodiments, environment 110 may not have all of the components listed and/or may have other elements instead of, or in addition to, those listed above.

User system 112 may be any machine or system used to access a database user system. For example, any of the user systems 112 could be a handheld computing device, a mobile phone, a laptop computer, a tablet, a work station, and/or a network of computing devices. As illustrated in FIG. 2A (and in more detail in FIG. 2B), user systems 112 interact via a network 114 with an on-demand database service, which in this embodiment is system 116.

An on-demand database service, such as system 116, is a database system that is made available to outside users that are not necessarily concerned with building and/or maintaining the database system, but instead, only that the database system be available for their use when needed (e.g., on the demand of the users). Some on-demand database services store information from one or more tenants into tables of a common database image to form a multi-tenant database system (MTS). Accordingly, the terms "on-demand database service 116" and "system 116" will be used interchangeably in this disclosure. A database image may include one or more database objects or entities. A database management system (DBMS) or the equivalent may execute storage and retrieval of information against the database objects or entities, whether the database is relational or graph-oriented. Application platform 118 is a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permission levels for the current user. For example, where a salesperson is using a particular user system 112 to interact with system 116, that user system has the capacities and permissions allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global network of networks often referred to as the Internet, that network will be used in many of the examples herein. However, it should be understood that the networks used with the one or more implementations are not so limited, although TCP/IP is a frequently implemented protocol.

User systems 112 communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a browser for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the data stored in the MTS; however, other alternative configurations may be used instead.

In one embodiment, system 116 implements a web-based customer relationship management (CRM) system. For example, in one embodiment, system 116 includes application servers configured to implement and execute CRM software applications as well as provide related data, code, forms, web pages and other information to and from user systems 112 and to store to, and retrieve from, a database system related data, objects, and Web page content. With a multi-tenant system, data for multiple tenants may be stored in the same physical database object; however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 116 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

One arrangement for elements of system 116 is shown in FIG. 2A, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 2A include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide web pages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 2B also illustrates environment 110. However, in FIG. 2B elements of system 116 and various interconnections in an embodiment are further illustrated. FIG. 2B shows that user system 112 may include processor system 1110, memory system 1111, input system 112C, and output system 112D. FIG. 2B shows network 114 and system 116. FIG. 2B also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 2A. Regarding user system 112, processor system 1110 may be any combination of one or more processors. Memory system 1111 may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks.

As shown by FIG. 2B, system 116 may include a network interface 115 (of FIG. 2A) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases, or in distributed memory as described herein.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. A detailed description of some PL/SOQL language embodiments is discussed in U.S. Pat. No. 8,271,341, entitled Method And System For Governing Resource Consumption in a Multi-Tenant System, which is incorporated by reference herein. Invocations to applications may be detected by one or more system processes, which manages retrieving application metadata 216 for the subscriber making the invocation and executing the metadata as an application in a virtual machine.

Each application server 200 may be coupled for communications with database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, an interface system implementing a load balancing function (e.g., an F5 Big-IP load balancer) is coupled for communication between the application servers 200 and the user systems 112 to distribute requests to the application servers 200. In one embodiment, the load balancer uses a "least connections" algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant and handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be shared organization-wide or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled Custom Entities and Fields in a Multi-Tenant Database System, is hereby incorporated herein by reference, and teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An apparatus for performing a quality check on database records, the apparatus comprising:
  a processor; and
  a non-transitory computer readable medium storing a plurality of instructions, which when executed, cause the one or more processors to:
    select, by a database system, a first record comprising a first entity being assigned a first predefined label, and a second entity being assigned a second predefined label, the second predefined label being different than the first predefined label, the first entity including multiple terms;
    rearrange, by the database system, the multiple terms of the first entity into a plurality of permutations;
    evaluate, by the database system, for each permutation, a likelihood that the permutation corresponds to the first entity of the first record;
    determine, by the database system, a first number of times that the permutation of the first entity with a highest likelihood is assigned to the first predefined label in stored database records;
    determine, by the database system, a second number of times that the permutation of the first entity with the highest likelihood is assigned to any label in the stored database records;
    determine, by the database system, a likelihood that the first predefined label that is assigned to permutation of the first entity with the highest likelihood is correct, wherein the assigned first predefined label likelihood is determined based the first number and the second number; and
    initiate, by the database system, action to correct the first record when the assigned first predefined label likelihood is less than a first threshold.

2. The apparatus of claim 1, wherein the instructions further cause the processor to:
  compare a first entity of the first record with the corresponding first entity of the stored database records to determine a first frequency of times that the first predefined label of the first entity of the first record is assigned to the corresponding first entity of the stored database records;
  compare the first entity of the first record with the other entities of the stored database records to determine a second frequency of times that the first predefined label of the first entity of the first record is assigned to any entity of the stored database records; and
  initiate action to correct the first predefined label of the first entity of the first record when the ratio of the first frequency to the second frequency is less than a threshold.

3. The apparatus of claim 2, wherein the instructions further cause the processor to:
  perform the steps to compare the first entity for each of the multiple terms when the first entity includes multiple terms.

4. The apparatus of claim 1, wherein the instructions further cause the processor to:
  compare a plurality of the entities of the first record with the corresponding entities of the stored database records to determine a first frequency of times that the labels assigned to the entities of the first record match the corresponding entities of the stored database records;
  compare the plurality of the entities of the first record with all other entities of the stored database records to determine a second frequency of times that the labels assigned to the entities of the first record match the entities of any of the stored database records;
  initiate action to correct at least one label of at least one entity of the first record when the ratio of the first frequency to the second frequency is less than a threshold.

5. The apparatus of claim 4, wherein the instructions further, cause the processor to:
  determine the likelihood that all of the labels of the first record are correct by calculating for each entity of the first record the probability that the entity is correct, and multiplying together the probabilities for all entities of the first record.

6. A computer program product comprising computer-readable program code to be executed by one or more processors when retrieved from a non-transitory computer-readable medium, the program code including instructions to:
  select, by a database system, a first record comprising a first entity being assigned a first predefined label and a second entity being assigned a second predefined label, the second predefined label being different than the first predefined label, the first entity including multiple terms;
  rearrange, by the database system, the multiple terms of the first entity into a plurality of permutations;
  evaluate, by the database system, for each permutation, a likelihood that the permutation corresponds to the first entity of the first record;
  determine, by the database system, a first number of times that the permutation of the first entity with a highest likelihood is assigned to the first predefined label in stored database records;
  determine, by the database system, a second number of times that the permutation of the first entity with the highest likelihood is assigned to any label in the stored database records;
  determine, by the database system, a likelihood that the first predefined label that is assigned to permutation of the first entity with the highest likelihood is correct, wherein the assigned first predefined label likelihood is determined based the first number and the second number; and
  initiate, by the database system, action to correct the first record when the assigned first predefined label likelihood is less than a first threshold.

7. The computer program product of claim 6, wherein the program code includes further instructions to:
- compare a first entity of the first record with the corresponding first entity of the stored database records to determine a first frequency of times that the first predefined label of the first entity of the first record is assigned to the corresponding first entity of the stored database records;
- compare the first entity of the first record with the other entities of the stored database records to determine a second frequency of times that the first predefined label of the first entity of the first record is assigned to any entity of the stored database records; and
- initiate action to correct the first predefined label of the first entity of the first record when the ratio of the first frequency to the second frequency is less than a threshold.

8. The computer program product of claim 7, wherein the program code includes further instructions to:
- perform the steps to compare the first entity for each of the multiple terms when the first entity includes multiple terms.

9. The computer program product of claim 6, wherein the program code includes further instructions to:
- compare a plurality of the entities of the first record with the corresponding entities of the stored database records to determine a first frequency of times that the labels assigned to the entities of the first record match the corresponding entities of the stored database records;
- compare the plurality of the entities of the first record with all other entities of the stored database records to determine a second frequency of times that the labels assigned to the entities of the first record match the entities of any of the stored database records;
- initiate action to correct at least one label of at least one entity of the first record when the ratio of the first frequency to the second frequency is less than a threshold.

10. A method for performing a quality check on database records, the method comprising:
- selecting, by a database system, a first record comprising a first entity being assigned a first predefined label and a second entity being assigned a second predefined label, the second predefined label being different than the first predefined label, the first entity including multiple terms;
- rearranging, by the database system, the multiple terms of the first entity into a plurality of permutations;
- evaluating, by the database system, for each permutation, a likelihood that the permutation corresponds to the first entity of the first record,
- determining, by the database system, a first number of times that the permutation of the first entity with a highest likelihood is assigned to the first predefined label in stored database records;
- determining, by the database system, a second number of times that the permutation of the first entity with the highest likelihood is assigned to any label in the stored database records;
- determining, by the database system, a likelihood that the first predefined label that is assigned to permutation of the first entity with the highest likelihood is correct, wherein the assigned first predefined label likelihood is determined based the first number and the second number; and
- initiating, by the database system, action to correct the first record when the assigned first predefined label likelihood is less than a first threshold.

11. The method of claim 10, further comprising:
- comparing a first entity of the first record with the corresponding first entity of the stored database records to determine a first frequency of times that the first predefined label of, the first entity of the first record is assigned to the corresponding first entity of the stored database records;
- comparing the first entity of the first record with the other entities of the stored database records to determine a second frequency of times that the first predefined label of the first entity of the first record is assigned to any entity of the stored database records; and
- when the ratio of the first frequency to the second frequency is less than a threshold, initiate action to correct the first predefined label of the first entity of the first record.

12. The method of claim 11, further comprising:
- when the first entity includes multiple terms, performing the steps to compare the first entity for each of the multiple terms.

13. The method of claim 10, further comprising:
- comparing a plurality of the entities of the first record with the corresponding entities of the stored database records to determine a first frequency of times that the labels assigned to the entities of the first record match the corresponding entities of the stored database records;
- comparing the plurality of the entities of the first record with all other entities of the stored database records to determine a second frequency of times that the labels assigned to the entities of the first record match the entities of any of the stored database records;
- when the ratio of the first frequency to the second frequency is less than a threshold, initiate action to correct at least one label of at least one entity of the first record.

14. The method of claim 13, further comprising:
- determine the likelihood that all of the labels of the first record are correct by calculating for each entity of the first record the probability that the entity is correct, and multiplying together the probabilities for all entities of the first record.

* * * * *